(12) United States Patent
Wilhelm et al.

(10) Patent No.: US 6,800,718 B1
(45) Date of Patent: Oct. 5, 2004

(54) PROCESS FOR PRODUCING POLYTRIMETHYLENE TEREPHTHALATE (PTT)

(75) Inventors: Fritz Wilhelm, Karben (DE); Eckhard Seidel, Frankfurt/Main (DE); Hans Reitz, Rosbach (DE); Ulrich Thiele, Bruchköbel (DE); Klaus Mackensen, Frankfurt/Main (DE); Donald Ross Kelsey, Fulshear, TX (US); Robert Lawrence Blackbourn, Houston, TX (US); Robert Stephen Tomaskovic, Richmond, TX (US)

(73) Assignees: Zimmer Aktiengesellschaft, Frankfurt/Main (DE); Shell Oil Company, Houston, TX (US)

( * ) Notice: Subject to any disclaimer, the term of this patent is extended or adjusted under 35 U.S.C. 154(b) by 0 days.

(21) Appl. No.: 10/070,352
(22) PCT Filed: Apr. 17, 2000
(86) PCT No.: PCT/EP00/03474
§ 371 (c)(1),
(2), (4) Date: Jul. 31, 2002
(87) PCT Pub. No.: WO00/64962
PCT Pub. Date: Nov. 2, 2000

(30) Foreign Application Priority Data

Apr. 22, 1999 (EP) .............................................. 99107370

(51) Int. Cl.⁷ .............................................. C08G 63/78
(52) U.S. Cl. ..................... 528/279; 528/302; 528/308; 528/308.6; 526/65; 526/66; 526/67; 526/68; 526/71; 524/783
(58) Field of Search ................................ 528/279, 302, 528/308, 308.6; 526/65, 66, 67, 68, 71; 524/783; 428/364, 402

(56) References Cited

U.S. PATENT DOCUMENTS

| | | | | |
|---|---|---|---|---|
| 2,456,319 A | * | 12/1948 | Read | 224/166 |
| 3,366,597 A | | 1/1968 | Fort, Jr. | |
| 4,011,202 A | * | 3/1977 | Ebner et al. | 528/483 |
| 4,100,142 A | | 7/1978 | Schaefer et al. | |
| 4,611,049 A | * | 9/1986 | Kuratsuji et al. | 528/279 |
| 5,340,909 A | * | 8/1994 | Doerr et al. | 528/276 |
| 5,459,229 A | * | 10/1995 | Kelsey et al. | 528/275 |
| 5,599,900 A | * | 2/1997 | Bhatia | 528/491 |
| 5,798,433 A | * | 8/1998 | Schmidt et al. | 528/279 |
| 6,277,947 B1 | | 8/2001 | Kelsey et al. | |
| 6,281,325 B1 | | 8/2001 | Kurian et al. | 528/279 |
| 6,326,456 B2 | | 12/2001 | Kelsey et al. | |

FOREIGN PATENT DOCUMENTS

| | | | |
|---|---|---|---|
| WO | WO 97/23543 | * | 7/1997 |
| WO | WO 99/11709 | * | 3/1999 |
| WO | WO 99/11845 | * | 3/1999 |
| WO | WO 01/58980 A1 | | 8/2001 |
| WO | WO 01/58981 A1 | | 8/2001 |
| WO | WO 01/58982 A1 | | 8/2001 |

* cited by examiner

*Primary Examiner*—Samuel A. Acquah
(74) *Attorney, Agent, or Firm*—Herbert Dubno

(57) ABSTRACT

Process of producing polytrimethylene terephthalate (PTT) by esterification of terephthalic acid (TPA) with trimethylene glycol (TMG) in the presence of a catalytic, titanium compound, precondensation and polycondensation. The esterification is effected in at least two stages, where in the first stage a molar ratio of TMG to TPA of 1.25 to 2.5, a content of titanium of 0 to 40 ppm, a temperature of 245 to 260° C. as well as a pressure of 1 to 3.5 bar are adjusted. In the at least one subsequent stage a content of titanium is adjusted which is higher than in the initial stage by 35 to 110 ppm. For generating the vacuum in the polycondensation and in the precondensation, there are used vapor jet pumps operated with TMG vapor.

19 Claims, No Drawings

PROCESS FOR PRODUCING POLYTRIMETHYLENE TEREPHTHALATE (PTT)

This invention relates to a process of producing polytrimethylene terephthalate (PTT) with an intrinsic viscosity of at least 0.75 dl/g by esterification of terephthalic acid (TPA) with trimethylene glycol (TMG) in the presence of a catalytic titanium compound to obtain an esterification product, precondensation of the esterification product to obtain a precondensation product, and polycondensation of the precondensation product to obtain PTT.

Processes of producing PTT are known (U.S. Pat Nos. 2,456,319; 4,611,049; 5,340,909; 5,459,229; 5,599,900).

For instance, the U.S. Pat. No. 4,611,049 describes the use of a protonic acid as co-catalyst for accelerating the polycondensation, where the addition of p-toluene sulfonic acid in a concentration of 50 mmol-% effects an increase of the maximum achievable intrinsic viscosity of 0.75 dl/g in a batch process catalyzed with 50 mmol-% tetrabutyl titanate to 0.90 dl/g.

The U.S. Pat. No. 5,340,909 proposes to achieve an improvement of the polycondensation capacity and the color of the polytrimethylene terephthalate by using a tin catalyst, which together with titanium can already be present in the esterification. Statements on the influence of recirculation of the vapor condensates obtained during the polycondensation on the polycondensation capacity of the reaction melt cannot be found in the U.S. Pat. No. 5,340,909.

The U.S. Pat. No. 5,459,229 proposes to reduce the concentration of acrolein in the vapors by adding alkalines to the condensates produced during the esterification of trimethylene glycol and terephthalic acid. The U.S. Pat. No. 5,459,229 does not contain any details concerning the esterification and polycondensation.

The U.S. Pat. No. 5,599,900 describes a process of producing polytrimethylene terephthalate, where in the presence of an inert stripping gas either after the transesterification or after the esterification a polytrimethylene terephthalate with a degree of polymerization of 64 is synthesized. Moreover, it is desired to also adjust higher molecular weights but this is not proven by experiment.

WO 97/23543A describes a process of producing polytrimethylene terephthalate, where it is provided to first of all produce a preproduct with an intrinsic viscosity of 0.16 dl/g by means of transesterification. This preproduct is converted to pastilles by means of dripping, which pastilles directly crystallize at crystallization temperatures up to 130° C. The actual polymer is produced subsequently by solid-phase condensation. It is disadvantageous that a high amount of trimethylene glycol and oligomers gets into the process gas and must be recovered or burnt in an expensive way.

The U.S. Pat. No. 5,798,433 describes a process of producing PTT by direct esterification of terephthalic acid with 1,3-propanediol and subsequent precondensation and polycondensation. The PTT produced contains not more than 5 ppm acrolein and 3 ppm allyl alcohol. It is obtained by esterification in the presence of 30 to 200 ppm titanium in the form of an inorganic esterification catalyst containing at least 50 mol-% $TiO_2$ as a precipitate, blocking the esterification catalyst after the esterification by adding 10 to 100 ppm phosphorus in the form of an oxygen containing phosphorus compound, and subsequent precondensation and polycondensation in the presence of 100 to 300 ppm antimony in the form of a usual antimony polycondensation catalyst as well as optionally adding usual color agents. The quantity of the required catalyst is very high and causes severe disadvantages in the product quality especially with regard to the thermal product stability.

From U.S. Pat. No. 4,011,202 the use of glycol jet pumps is known. However, the use of TMG-jets is not yet detailed.

It is the object of the invention to create a melt phase process of producing PTT with an intrinsic viscosity between 0.75 and 1.15 dl/g and a good thermal stability, and to achieve at the same time an efficiently long service life of the filters when the polymer melt is filtered prior to processing the same to form the end products. The process may be a batch or continuous process. Additionally, the PIT process should also allow the recycling of TMG and oligomer by-products.

The foregoing objects are achieved in accordance with the invention by a process as defined in the claims.

The characteristic features of this process, which comprises the catalytic esterification of TPA with TMG, precondensation of the esterification product and polycondensation of the precondensation product, are as follows:

The esterification is performed in at least 2 stages, one initial stage and at least one second, subsequent stage connected to a process column.

The catalyst used for esterification and polycondensation is a titanium compound in a stabilized liquid formulation, which is prepared from a catalytic titanium compound, an organic diacid and TMG as solvent, in such way that the liquid catalyst feed contains less than 5 wt-% titanium.

The catalyst used for esterification in the first, initial stage can be alternatively a Ti containing liquid reaction product from TPA and TMG with a degree of esterification of at least 97%, which may be recycled from a later reaction stage and fed to the initial esterification stage together with the raw materials.

A defined quantity of the described liquid catalyst feed is introduced into the first, initial esterification stage and separately a second defined quantity of the liquid catalyst feed is added to the at least one subsequent stage of esterification.

7) In the first, initial esterification stage a total molar feed ratio of TMG/TPA of 1.15 to 2.5, an amount of titanium of 0 to 40 ppm, which is in maximum 35% by weight of the total amount of catalyst, a temperature of 240 to 275° C. and an absolute pressure of 1 to 5.0 bar, preferably 3.5 bar, are adjusted, whereby the reaction is continued until 90 to 95% of the TPA is esterified.

In the at least one subsequent esterification stage an additional amount of titanium of 35 to 110 ppm, which is 65 to 100% of the total amount of catalyst, a temperature of 245 to 260° C. and an absolute pressure of 0.7 to 1.2 bar are adjusted, whereby the reaction is continued until 97 to 99% of the TPA are esterified.

The precondensation is performed at a temperature of 245 to 260° C. under a reduced pressure in the range from 2 to 200 mbar.

The polycondensation is carried out in the melt phase at a temperature increasing from the entry to the exit of the polycondensation reactor from 252 to 267° C. and at an absolute pressure of 0.2 to 2.5 mbar.

For generating the vacuum of the precondensation and polycondensation vapor-jet pumps are used, which are operated with TMG vapor, and the vapors sucked off and said TMG vapors are compressed by the vapor jet pumps and condensed by spraying them with a liquid which predominantly consists of TMG, for example the condensate from these spray condensers and optionally fresh make-up TMG.

The feed amount of titanium in the first, initial esterification stage preferably is in the range from 5 to 25 ppm.

As catalytic titanium compound to prepare the catalyst liquid there may preferably be used titanium tetrabutylate or titanium tetraisopropylate. As advantageous catalytic titanium compounds there may for instance also be used any catalytic titanium compound, such as titanium alkylates and their derivates, like tetra-(2-ethylhexyl)-titanate, tetrastearyl titanate, diisopropoxy-bis-(acetyl-acetonato)-titanium, di-n-butoxy-bis-(triethanolaminato)-titanium, tributyl monoacetyltitanate, triisopropyl monoacetyltitanate or tetrabenzoic acid titanate, titanium complex salts, like alkali titanium oxalates and malonates, potassium hexafluorotitanate, or titanium complexes with hydroxycarboxylic acids such as tartaric acid, citric acid or lactic acid. Also special catalysts as titanium dioxide-silicon dioxide-co-precipitate or hydrated alkaline containing titanium dioxide can be used.

The solvent which is used in the liquid catalyst feed is TMG, in which for stabilization reasons a $C_4$ to $C_{12}$ dicarboxylic acid is dissolved in quantities below its saturation concentration at ambient temperature. A further embodiment consists in that in TMG $C_2$ to $C_{12}$ monocarbolic acid is dissolved below ist saturation concentration The organic di-acid which is preferably used for the liquid catalyst feed is selected from terephthalic acid, isophthalic acid or another $C_4$–$C_{12}$ aromatic or aliphatic dicarboxylic acid. Preferably the $C_4$ to $C_{12}$ dicarboxylic acid is incorporated in the PTT and does not act as chain stopper.

As further embodiment of the invention the catalyst liquid can be a Ti containing liquid reaction product from TPA and TMG with a degree of esterification of at least 97%. This product is recycled from a later reactor stage and mixed to the first, initial esterification process together with the raw materials. In the continuous process the recycled product amounts to 5 to 40 wt-%, more preferably to 10 to 30 wt-% of the nominal throughput. In the case of the batch process the amount of recycled product lies between 25 and 85 wt-%, preferably between 35 and 70 wt-% of the nominal batch size. This option of the invention is including reaction products which may be withdrawn at any point between the exit from the second stage of esterification and the entry in the polycondensation, and which are used as liquid catalyst feed for the first initial esterification stage.

The second portion of the cataıst may be fed after the esterification step.

The described special catalyst liquid is well proven at temperatures within the range of 250 to 270° C., an elevated molar feed ratio of TMG to TPA between 1.15 and 2.5, preferably between 1.5 and 2.4, and a pressure of 1 to 5.0 bar, preferably 3.5 bar. Under these conditions only a minor formation of non-filterable particles occurs independently whether delustering agents, like TiO2, or other additives are used. This is particularly necessary in the production of fibers.

In accordance with a further preferred aspect of the invention, the first initial stage of esterification is conducted to a TPA conversion of 90 to 95%, and the at least second stage of esterification rises the TPA conversion to 97 up to 99%. Latest in the second stage of esterification it has be assured that the last particles of solid TPA from the paste are completely dissolved and the melt is clear and bright.

The catalyst liquid introduced into the second or further stages of esterification is preferably a clear solution. These above mentioned conditions enable low filter values of the PTT.

The process can be a continuous or a batch process. In the discontinuous process the initial process cycle with a transiently heterogeneous reaction mixture and a limited TPA-conversion of below 95% is considered as the first, initial stage of esterification, while the later reaction cycle in a homogeneous melt phase at a TPA-conversion of at least 97% represents the at least one subsequent esterification stage. Accordingly the second part of the liquid catalyst feed is added when the TPA has been esterified to at least 95%, preferably to more than 97%.

The precondensation, especially in the continuous process, is favourably split into two pressure sections to provide an optimum condensation progress. The first stage of precondensation is performed between 50 and 150 mbar, the second stage between 2 and 10 mbar.

It is particularly advantageous when the polycondensation of the prepolymer melt is performed at a pressure of 0.3 to 0.8 mbar. Preferably the polycondensation reactor is a disc ring reactor or a cage type reactor, which allows the formation of steadily renewed, large film surfaces of the reaction product and facilitates by this the evaporation of the split products. Under these conditions, increased intrinsic viscosities in the range from 0.75 to 1.15 dl/g are possible.

It was surprisingly found out that in accordance with the inventive process very advantageous filter values of 0 to 40 bar·cm$^2$/kg can be realized (determination of filter value see below).

In accordance with a further object of the invention it is provided that the condensates of the spray condensers, optionally after the distillation of low boilers, are recirculated into the first initial and possibly further stages of esterification. In this way, a substantial reduction of the losses in raw materials is achieved.

In accordance with a further preferred embodiment of the invention it is provided that the PTT contains up to 20 wt-% comonomer units derived from other dicarboxylic acids and/or diols. As other dicarboxylic acid there may for instance be used adipic acid, isophtalic acid or naphthalene dicarboxylic acid. As diols there may for instance be used ethylene glycol, diethylene glycol, triethylene glycol, butylene glycol, polyglycols as well as cyclohexane dimethanol. In this way, the end product can be adapted to the respective application relatively easily.

A further embodiment of the invention consists in that at any point before the end of the polycondensation in the melt phase usual additives such as delustering agents and/or color agents and/or branching agents and/or stabilizers can be added. By means of this measure, the number of the applications of the end product will be increased in connection with a particular viscosity adjustment.

In accordance with the invention, a polyester-soluble cobalt compound, for instance cobalt acetate and/ or polyester soluble organic dyes can be used as color agent or blue toner. As stabilizer a phosphorus compound is added with up to 20 ppm phosphorus, based on PTT, in connection with the cobalt compound and up to 10 ppm phosphorus without any addition of cobalt. By this amounts of phosphorus the catalysis of the thermal degradation of the PTT melt by ions of heavy metals including of the cobalt is stopped because of the formation of neutral phosphorus salts. In special cases the addition of phosphorus may be omitted completely; this depends on the quality of the raw materials, the construction materials of the equipment as well as on the final product application.

A further aspect of the invention consists in that optionally carboxylic acids with three or more COOH groups, polyfunctional acid anhydrides, or polyfunctional alcohols with three or more OH groups, or carboxyphosphonic acids or the esters thereof in concentrations below 5000 ppm are used as branching agents. For polycarboxylic acids and polyalcohols in most cases concentrations below 1000 ppm are sufficient. These compounds can particularly be used for adjusting or raising the intrinsic viscosity simultaneously.

The PTT can be directly processed to fibers, films or other molded materials. In accordance with a further embodiment of the invention it is provided that after the polycondensation in the melt phase the PTT is granulated and crystallized.

The resulting granulate can also be thermally treated in the solid state for further IV build up or for devolatilizing low molecular organic products such as acrolein, allyl alcohol and water. The PTT granulate can then be processed to fibers, filaments, films or molded articles.

The processed products, i.e. fibers, filaments, films, molded articles or chips, are characterized by an IV of 0.8 to 1.1 dl/g, a filterablity of <40 bar·cm$^2$/kg and a thermal stability (as defined below) of >80%.

The subject-matter of the invention will be explained in detail with reference to the following examples.

In all examples, the intrinsic viscosities (IV) were determined with a solution of 0.5 g polyester in 100 ml of a mixture of phenol and 1,2-dichlorobenzene (3:2 parts by weight) at 25° C.

The COOH terminal group concentration was determined by photometric titration with 0.05 n ethanolic potassium hydroxide solution against bromothymol blue of a solution of polyester in a mixture of o-cresol and chloroform (70:30 parts by weight).

The measurement of the polymer color values was made on crystallized polyester granules (crystallization at 150±5° C./1 h) in a tristimulus calorimeter containing three photo-electric cells with a red, green or blue filter. The color values were calculated from the parameters X, Y and Z according to CIELAB.

The filtration behavior of the product melts was determined as follows: PTT dried for 13 h at 130° C. and a reduced pressure of <1 mbar was molten in a laboratory extruder and metered through a disc filter with a mesh size of 15 μm and a filter area of 2.83 cm$^2$ by means of a gear pump at a temperature of 260° C. The increase in pressure before the filter was recorded in relation to the amount of melt is conveyed and the filterability is calculated as filter value (FV):

FV=filter pressure[bar]·filter area[cm$^2$]/amount of melt [kg].

The thermal stability (TS) of the PTT melt was determined by measuring the intrinsic viscosity of the PTT chips dried for 13 h at 130° C. and a reduced pressure of <1 mbar as $IV_0$ before and as $IV_T$ after tempering of the dried chips over one hour at a reference temperature of 255° C. in a closed tube under nitrogen.

$$TS[\%]=100 \cdot IV_T/IV_0$$

The stated concentrations of the catalysts and additives used in the following examples are defined as parts per million (ppm) referring to the TPA feed.

The catalyst solutions used in the examples according to the invention were prepared as follows:

Catalyst Preparation A:

(TPA-stabilized TMG Solution)

Because of the hygroscopic properties of TMG, the catalyst solutions were preferably prepared and stored under nitrogen atmosphere.

TMG was preheated to 80° C. 50 mg TPA per kg TMG were added while stirring, and stirring was continued until a clear solution was obtained after 20 minutes. The TMG/TPA solution was cooled to about 30° C.

The titanium tetrabutylate was metered with a dropping funnel to the cold, clear acidified TMG solution while stirring. There was thus produced a solution of 2% titanium tetrabutylate in acidified TMG, which was used in this form. When the first drops of titanium tetrabutylate were added, the TMG solution turned light yellow. Remarkably, this color did not change anymore during the further addition of titanium tetrabutylate.

Catalyst Preparation B:

(IPA-stabilized TMG Solution)

The TMG was preheated to about 60° C. Then a clear solution of 500 mg IPA per kg TMG was produced by stirring. This concentrated solution was cooled to about 30° C. Before adding the titanium tetrabutylate the cooled solution was diluted with fresh TMG in a ratio of 1:4. Thus, the concentration of IPA in the finished solution was 100 mg IPA per kg TMG.

The addition of the titanium tetrabutylate to the TMG/IPA solution was performed in the same way as for preparation A.

The invention is illustrated in the following examples.

The results of the examples are summarized together with the fed concentrations of catalyst and additives in the table. Examples 1, 2 and 4 are comparative examples.

EXAMPLE 1–3

Batch Process

In this batchwise production of PTT a part of prepolymer from a preceding, prepolymer batch in a quantity of about 42 wt-% of the nominal batch size was kept back in the esterification reactor for the next reaction cycle for stirring the esterification product and for feeding and heating the raw materials TMG and TPA as a paste including the esterification catalyst and optionally cobalt acetate as color agent. The molar TMG to TPA feed ratio of the is paste is listed in the table.

The quantity of TPA fed into the esterification reactor was 180 kg. The feeding time was 130 minutes. The total cycle time of esterification in example 1–2 was 160 minutes at a temperature of 265° C. and a pressure of 1000 mbar (abs.). A column disposed subsequent to the esterification reactor was used for separating the low-boiling compounds, mainly process water, from the trimethylene glycol in the vapors from the esterification, and for the recirculation of the distilled TMG to the process all the time of esterification. The precondensation was carried out in 30 minutes at a simultaneous pressure reduction to 50 mbar (abs.). Thereafter, the prepolymer melt was transferred to a disc ring reactor, and the polycondensation was started by agitating defined by a standard program of speed control an and further reducing the pressure within 45 minutes to 0.5 mbar as final pressure. The polycondensation temperature in example 1–2 increased from 260 to 268° C. The total duration of polycondensation indicated in the table corresponded to the maximum viscosity of the polymer possible under the selected conditions, i.e. if the polycondensation was further continued, the intrinsic viscosity of the polymer decreased again due to the predominance of the thermal degradation reactions. Upon reaching the viscosity maximum, the polycondensation was stopped. At an applied pressure of 55 to 60 bar the polymer melt was discharged from the reactor and granulated.

Special Feed Conditions within Example 1
(Comparative)

In example 1, titanium dioxide/silicon dioxide co-precipitate containing 80 mole-% $TiO_2$ with 50 ppm Ti was fed to the paste as esterification catalyst. In addition, cobalt acetate with 40 ppm Co was added to the paste. Before starting of the precondensation, phosphoric acid with 40 ppm P was added to the melt and after further 2 minutes antimony triacetate with 250 ppm Sb was added as polycondensation catalyst.

Special Feed Conditions within Example 2 (Comparative)

In example 2, titanium tetrabutylate with 75 ppm Ti was fed to the paste as esterification catalyst. Before start of the precondensation reaction in the esterification reactor, antimony triacetate with 200 ppm Sb was added as polycondensation catalyst.

Selected process conditions and quality values of the polytrimethylene terephthalate obtained are listed in the following table. In the comparative process very high amounts of catalyst up to 300 ppm were required. In the following inventive examples 80 ppm Ti were sufficient at comparable process times. The process results of the Comparative examples show a deficit with regard to the possible IV-build-up, the thermostability and the filterability.

Special Conditions within Example 3 (Inventive)

According to example 3, TMG and commercially available TPA in a molar ratio of 1.3 were continuously fed into a paste mixer; additionally 15 ppm titanium were added via a catalyst liquid of titanium tetrabutylate in TMG containing TPA according to catalyst preparation A. The resulting paste was fed into the esterification reactor over 130 minutes and reacted batchwise (similar to example 1 and 2). The reaction was performed at an increased pressure of 2000 mbar and at a temperature of 255° C. during a cycle time of 160 minutes. The column of the esterification was operated at a molar recycling ratio of TMG to TPA of 0.1 to 0.9, which ratio passed through a maximum during the esterification time. The average total molar feed ratio of TMG to TPA in the esterification reactor was about 1.8.

For completion of the esterification, the reactor pressure was reduced to 1000 mbar within 15 minutes and the esterification was continued in the later stage while stirring at 1000 mbar for 30 minutes. At 5 minutes before starting the vacuum program 65 ppm titanium were added to the esterification product as polycondensation catalyst via the catalyst liquid of preparation A at steady stirring of the product mixture. The subsequent precondensation was carried out during 30 minutes at a temperature of 255° C. and a simultaneous reduction of the pressure to 100 mbar. Subsequently, the melt was transferred to a disc ring reactor, where it was polycondensated at an increasing temperature of 251–262° C. at a dwell time of 165 minutes and a final pressure of 0.5 mbar. Thereafter the melt was discharged and granulated to PTT chips.

This example clearly illustrates according to the table that under batch conditions, when using the conditions described in the present invention, a stable PTT with an IV of 1.1 dl/g and a filter value of 27 bar·cm²/kg can be produced. The relatively low concentration of carboxyl endgroups in the PTT indicated that no remarkable polymer degradation during discharge of the PTT occurred. The thermal stability of the PTT enabled a problem-free extrusion and spinning or molding to obtain high quality PTT products.

EXAMPLE 4 to 8

Continuous Process

Example 4 (Comparative)

TMG and commercially available TPA in a molar ratio of 1.16 were continuously fed to a paste mixer, and a paste was produced. The catalyst concentration in the paste was 15 ppm titanium. As catalyst titanium tetrabutylate was used as a 10% mixture with TMG. The paste was continuously fed into the initial esterification reactor and reacted at a pressure of 1000 mbar and a temperature of 255° C. for a mean dwell time of 172 minutes under stirring and steady TMG reflux from the esterification column. Into the transfer line to a subsequent stirred esterification stage, a second portion of the catalyst (10% titanium tetrabutylate in TMG) with 65 ppm Ti was added, and the product was further esterified in the subsequent esterification stage at a pressure of 1000 mbar, a temperature of 255° C. with a mean dwell time of 60 minutes. The esterification product was transferred into a third reaction stage also equipped with a stirrer for precondensation at 100 mbar and 255° C. within 30 minutes.

Likewise the precondensation was completed in a further stage at 7 mbar, 257° C. within 35 minutes. The precondensate, showing an IV of 0.26 dl/g was transferred to a disc ring reactor by means of a gear-type metering pump for the final polycondensation at a vacuum of 0.5 mbar, a mean dwell ti me of 150 minutes, an increasing temperature profile of 258–264° C. and an agitator speed of 5.5 rpm. From the disc ring reactor, the melt was discharged and granulated.

The PTT thus produced had an intrinsic viscosity of 0.92 dl/g and a filter value of 143 bar·cm²/kg. The higher concentration of carboxyl endgroups in the PTT indicated another, from the invention different polymer formation, whereas the thermal properties of the products were similar. Polymers with such high filter values entail to a short service life of the filter in the spinning process, and are not suitable for the production of fibers and filaments.

Example 5

In example 5, the conditions for the production of PTT corresponded to example 4 with following exceptions. The molar ratio TMG:TPA in the paste was risen to 1.3; the catalyst concentration in the paste was 15 ppm titanium. As catalyst liquid the catalyst preparation B was used. The paste was continuously fed into the first initial esterification reactor and reacted while stirring at a pressure of 2000 mbar and a temperature of 255° C. for a mean dwell time of 172 minutes. The molar reflux from the column of the esterification amounted to 0.8 moles TMG per TPA; by this a total molar ratio of TMG to TPA of 2.1 was present. After the continuous transfer to a second subsequent esterification stage, a further amount of catalyst of 65 ppm Ti was added into the mixed esterification product in form of the catalyst preparation B. The esterification in the second stage, the precondensation and the polycondensation were performed at conditions identical to those in example 4.

The PTT thus produced had an intrinsic viscosity of 0.93 dl/g and a filter value of 5 bar·cm²/kg. The good filter value of the intermediate prepolymer sample of 8 bar·cm²/kg, already indicated a good filterability of the melt. In the PTT production process and in the production of fibers and filaments this offers great economic advantages due to a long service life of the filter.

Example 6

Similar to example 5, TMG and TPA were continuously fed into the paste mixer in a molar ratio of 1.25. Thereby 70 wt-% of the TMG used consisted of recycled TMG collected from the vapor condensers of different stages. The concentration of solids (a mixture of PTT oligomers) in the recycled TMG was 2.5 wt-%. In addition, 15 ppm titanium as catalyst solution, preparation B, and 20 ppm Co as cobalt acetate were added to the raw material paste, and the paste was pumped to the initial esterification stage. The total molar TMG to TPA feed ratio including the TMG-reflux from the column was 1.9. All other process conditions in esterification, precondensation and polycondensation were selected in accordance with example 4. According to example 5, additional 65 ppm Ti were added into the mixed esterification product of the subsequent second esterification stage. As catalyst liquid feed was used preparation B. Additionally 20 ppm P (as solution of phosphoric acid in TMG) were dosed into the transfer line of the esterification product to the first precondensation stage.

The granulated PTT had a viscosity of 0.918 dl/g and a filter value of 7 bar·cm²/kg.

Example 7

Example 7 was performed in a similar way as example 6, and for the production of paste there was likewise used recycled TMG. The molar ratio TMG to TPA was 1.25. 46 wt-% of the TMG present in the feed paste were recycled TMG with a content of oligomeric solids of 2.2 wt-%. Different to example 6, 10 ppm Co as cobalt acetate and 5 ppm P as phosphoric acid were added to the paste. The catalyst feed into the paste was 15 ppm Ti as catalyst liquid preparation A. The polycondensation catalyst was added in an amount of 65 ppm Ti, as catalyst liquid preparation A to the melt of the subsequent second esterification stage. The other process conditions were as following:

| 1st Esterification stage: | 249° C. | 2000 mbar | 230 min |
|---|---|---|---|
| 2nd Esterification stage: | 248° C. | 1000 mbar | 30 min |
| 1st Prepolycond. stage: | 247° C. | 80 mbar | 37 min |
| 2nd Prepolycond. stage: | 247° C. | 8 mbar | 41 min |
| Polycondensation stage: | 247–260° C. | 0.3 mbar | 220 min |

Under these process conditions a PTT was obtained with an IV of 0.93 dl/g, a high thermal stability and a good filterability.

Example 8

(Continuous Process with Recirculation of the Melt from Esterification 2 to Esterification 1)

TMG and TPA were continuously fed into the paste mixer in a molar ratio of 1.25. Thereby, 58 wt-% of the TMG used consisted of recycled TMG with 2 wt-% of oligomeric solids. After achieving stationary flow conditions the TMG/TPA feed paste without any catalyst was transferred to the first, initial stirred esterification stage. At the same time a separate partial recycling stream of 19 wt-% of the product from the subsequent second esterification stage to the first initial stage containing the catalyst as a diluted solution in a prereacted homogenous product mixture with an increased degree of esterification of about 97.5%.

The actual catalyst addition to the second esterification stage was carried out with 80 ppm Ti (based on PTT) as liquid catalyst preparation B. As a consequence of the partial product recycling from the second subsequent esterification stage into the initial esterification stage the relative throughput per 100 wt-% product was in both esterification stages increased to 119 wt-% and the average residence times were decreased to 135 and 48 minutes. The total molar TMG to TPA feed ratio to the esterification was 2.0. Further conditions were:

| 1st esterification stage: | 255° C. | 1800 mbar |
|---|---|---|
| 2nd esterification stage: | 255° C. | 1000 mbar. |

The process conditions in the precondensation and polycondensation were the same as in example 4. The final PTT product showed an IV of 0.913 dl/g, a good thermal stability, and a good filterability, in accordance with the invention.

What is claimed is:

1. A process of producing polytrimethylene terephthalate (PTT) with an intrinsic viscosity of at least 0.75 dl/g by esterification of terephthalic acid (TPA) with trimethylene glycol (TMG) in the presence of a catalytic titanium compound to obtain an esterification product, precondensation of the esterification product to obtain a precondensation product and polycondensation of the precondensation product to obtain PTT, characterized in that a) the esterification is performed in at least two stages, a first, initial stage and at least one second, subsequent stage connected to a process column, b) a liquid catalyst feed is prepared on base of TMG having a concentration of less than 5 wt-% titanium in the form of a titanium compound stabilized by a bifunctional organic acid, c) a major quantity between 65 and 100% of said liquid catalyst feed containing 35 to 110 ppm titanium, is introduced into the at least one subsequent esterification stage, operated at a temperature of 245 to 260° C., and a pressure of 0.7 to 1.2 bar, d) a minor quantity of said liquid catalyst feed containing 0 to 40 ppm titanium and equal in maximum to 35% of the total catalyst is directly fed to the initial esterification stage usually together with the raw materials, which direct catalyst feed can be partially or completely substituted by the same quantity of catalyst in a reaction product, which may be recycled from any further reaction stages and which is mixed to the raw materials for further reaction in said initial esterification stage in connection with a total molar TMG to TPA feed ratio of 1.15 to 2.5, a temperature of 240 to 270° C. and a pressure of 1–3.5 bar, e) the precondensation is performed at a temperature of 245 to 260° C. under a reduced pressure between 2 and 200 mbar, f) the polycondensation is carried out in the melt phase at a pressure of 0.2 to 2.5 mbar, a temperature of 252 to 267° C., basically increasing from the entry to the exit of the polycondensation reactor during agitation and formation of steadily renewed, large film surfaces of the re action product for evaporation of the split products, and g) for generating the vacuum to perform the precondensation and polycondensation vapor-jet pumps are used to remove the released TMG and PTT oligomers and low boilers from the gas phase of the reactors, and the vapor-jet pumps are operated with TMG vapor, and the vapors sucked off and compressed by the vapor-jet pumps and said TMG vapors are condensed by spraying them with a liquid which predominantly consists of TMG.

2. A process as claimed in claim 1, characterized in that said titanium compound is a titanium alkylate, like titanium tetrabutylate, titanium tetraisopropylate or tetra-(2-ethylhexyl)-titanate, or a titanium dioxide-silicon dioxideco-precipitate or a hydrated sodium containing titanium dioxide or a titanium salt of organic acids or a titanium complex with hydroxycarboxylic acids.

3. A process as claimed in claim 1, characterized in that said liquid catalyst feed contains trimethylene glycol, in which a $C_4$ to $C_{12}$ dicarboxylic acid is dissolved below its saturation concentration.

4. The process as claimed in claim 3, characterized in that terephthalic acid or isophthalic acid is used as $C_4$ to $C_{12}$ dicarboxylic acid.

5. The process as claimed in claim 1 characterized in that said liquid catalyst feed contains tri-methyleneglycol, in which a $C_2$ to $C_{12}$ monocarbolic acid is dissolved below ist saturation concentration.

6. A process as claimed in claim 1 characterized in that the process is a continuous process.

7. A process as claimed in claim 6, characterized in that a part of the reaction product is withdrawn at any point between the exit of the subsequent stage of esterification and the entry to the polycondensation and mixed to the raw materials by recycling said reaction product to the first, initial esterification stage.

8. A process as claimed in claim 7, characterized in that said reaction product recycled to the initial esterification stage lies in the range of 5 to 40 wt-% of the nominal throughput.

9. A process as claimed in claim 1 characterized in that the process is a discontinuous process, and the initial process cycle with a transiently heterogeneous reaction mixture and a limited TPA-conversion of below 95% represents said 'initial stage' and the later reaction cycle in a homogeneous melt phase with a TPA conversion of at least 97% represents said 'subsequent stage' of the esterification process, to which the major part of the catalyst is fed, and a portion of the reaction product kept back at the end of the precondensation is used for the next discontinuous process in step d as catalyst containing reaction product.

10. A process as claimed in claim 1 characterized in that the second portion of the catalyst is fed after the esterification step.

11. A Process as claimed in claim 9, characterized in that said catalyst containing reaction product recycled to the initial esterification stage lies in a range of 25 to 85 wt-% of the nominal batch size.

12. A process as claimed in claim 1 characterized in that the first, initial stage of esterification is conducted to a degree of esterification of 90 to 95%, and the subsequent stage of esterification is conducted to a degree of esterification of 97 to 99%.

13. A process as claimed in claim 1 characterized in that the condensed vapors from step g are recirculated to the initial and possibly further subsequent stages of the esterification, optionally after removing of the low boilers from TMG by distillation.

14. A process as claimed in claim 1 characterized in that the PTT contains to 20 wt-% comonomer units derived from other dicarboxylic acids and/or diols.

15. A process as claimed in claim 1 characterized in that at any point before the end of the polycondensation in the melt phase usual additives comprising delustering agents and/or color agents and/or branching agents and/or stabilizers are added.

16. A Process as claimed in claim 1 characterized in that said polycondensation reactor is a discring reactor or a cage type reactor.

17. A process as claimed in claim 1 characterized in that the PTT is after the polycondensation in the melt phase granulated to chips, and the chips are dried, crystallized and treated thermally in the solid phase.

18. A process as claimed in claim 1 characterized in that the PTT is processed into fibers or filaments or films or molded articles or chips.

19. A process as claimed in claims 18, characterized in that the processed products have an IV of 0.8 to 1.1 dl/g, a filterability of <40 bar·cm$^2$/kg and a thermal stability (as defined before) of >80%.

* * * * *